(12) United States Patent
Ishihara et al.

(10) Patent No.: US 11,528,628 B2
(45) Date of Patent: Dec. 13, 2022

(54) RADIO BASE STATION USING DISTRIBUTED ANTENNA AND SCHEDULING METHOD

(71) Applicant: NIPPON TELEGRAPH AND TELEPHONE CORPORATION, Tokyo (JP)

(72) Inventors: Koichi Ishihara, Musashino (JP); Tomoki Murakami, Musashino (JP); Hirantha Abeysekera, Musashino (JP); Toshiro Nakahira, Musashino (JP); Yasushi Takatori, Musashino (JP); Takafumi Hayashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 18 days.

(21) Appl. No.: 17/269,285

(22) PCT Filed: Aug. 13, 2019

(86) PCT No.: PCT/JP2019/031843
§ 371 (c)(1),
(2) Date: Feb. 18, 2021

(87) PCT Pub. No.: WO2020/040001
PCT Pub. Date: Feb. 27, 2020

(65) Prior Publication Data
US 2021/0392524 A1    Dec. 16, 2021

(30) Foreign Application Priority Data

Aug. 21, 2018 (JP) .............................. JP2018-154877

(51) Int. Cl.
*H04W 24/08* (2009.01)
*H04B 7/024* (2017.01)
(Continued)

(52) U.S. Cl.
CPC ............ *H04W 24/08* (2013.01); *H04B 7/024* (2013.01); *H04B 7/0452* (2013.01); *H04W 52/36* (2013.01)

(58) Field of Classification Search
CPC ............................. H04W 24/08; H04W 7/024
See application file for complete search history.

(56) References Cited

U.S. PATENT DOCUMENTS 9,667,301 B1 *  5/2017  Nassiri Toussi ......... H04B 1/40

FOREIGN PATENT DOCUMENTS

JP          2017143460 A       8/2017

OTHER PUBLICATIONS

Wonil Roh and Arogyaswami Paulraj, "MIMO Channel Capacity for the Distributed Antenna Systems", 2002, IEEE 56th, vol. 2, 2002.

* cited by examiner

*Primary Examiner* — Sulaiman Nooristany

(57) ABSTRACT

Provided is a wireless base station which uses distributed antennas and selects a combination of a plurality of wireless terminals and the distributed antennas of a wireless base station that performs multi-user transmission with respect to the plurality of wireless terminals in a multi-BSS wireless environment. The wireless base station includes: a scheduling unit that measures reception power (RSSI) from each wireless terminal at each of the distributed antennas and selects a combination of a plurality of wireless terminals and a plurality of antennas having approximately the same RSSIs in descending order for respective wireless terminals; and a transmission power control unit that sets minimum transmission power corresponding to the RSSI of the antenna when multi-user transmission is performed between (Continued)

the plurality of wireless terminals and the plurality of antennas combined by the scheduling unit.

4 Claims, 6 Drawing Sheets

(51) Int. Cl.
    *H04B 7/0452*     (2017.01)
    *H04W 52/36*     (2009.01)

– 1 –
RADIO BASE STATION USING DISTRIBUTED ANTENNA AND SCHEDULING METHOD

CROSS-REFERENCE TO RELATED APPLICATIONS

This application is a 371 U.S. National Phase of International Application No. PCT/JP2019/031843 filed on Aug. 13, 2019, which claims priority to Japanese Application No. 2018-154877 filed on Aug. 21, 2018. The entire disclosures of the above applications are incorporated herein by reference.

TECHNICAL FIELD

The present invention relates to a wireless base station and a scheduling method using distributed antennas that schedule a combination of antennas and wireless terminals according to a wireless environment (hereinafter referred to as multi-BSS) in which a plurality of basic service sets (BSSs) are co-located or a wireless environment (hereinafter referred to as single BSS) using a single BSS when multi-user transmission is performed in a distributed antenna system in which a wireless base station using distributed antennas and a plurality of wireless terminals perform communication.

Examples of multi-user transmission include multi user-multiple input multiple output (MU-MIMO) communication which uses a plurality of antennas and orthogonal frequency division multiple access (OFDMA) communication which uses a single antenna.

BACKGROUND ART

In a distributed antenna system, a wireless base station disposes a plurality of antennas in a distributed manner whereby the distance between an antenna of the wireless base station and an antenna of a wireless terminal is decreased, and as a result, the reception power of each wireless communication can be improved.

FIG. 5 illustrates a single user (SU) transmission example of a distributed antenna system.

In FIG. 5, a distributed antenna system includes a wireless base station APs (Access Point) including a plurality of antennas disposed in a distributed manner and a plurality of wireless terminals STAs (Stations). An AP can know a STA positioned near each antenna by measuring the reception power of the antenna.

In SU (single user) transmission from an AP to one STA, an antenna of the AP and the transmission power are set individually for each transmission destination STA. In this way, interference with areas outside a target area can be reduced.

As illustrated in FIG. 6, a method of reducing interference with areas outside a target area by controlling transmission power according to the RSSI of a selected antenna for each transmission destination STA is also being considered.

PTL 1 and NPL 1 disclose configurations supporting SU-MIMO and multi-user (MU)-MIMO by configuring antennas disposed in a distributed manner in a distributed antenna system as antenna sets each made up of a plurality of antennas and selecting an antenna set or antennas in the antenna set appropriately. SU-MIMO uses a plurality of antennas constituting one antenna set, for example. MU-MIMO uses each antenna in each of the plurality of antenna sets, for example. PTL 1 also discloses a configuration of controlling the transmission power for each of the selected antennas.

CITATION LIST

Patent Literature

[PTL 1] Japanese Patent Application Publication No. 2017-143460

Non Patent Literature

[NPL 1] Roh, Wonil, and Arogyaswami Paulraj, "MIMO channel capacity for the distributed antenna," Vehicular Technology Conference, 2002, Proceedings, V T C 2002-Fall, 2002 IEEE 56th, Vol. 2, IEEE, 2002.

SUMMARY OF THE INVENTION

Technical Problem

In the conventional distributed antenna system, a method of selecting an optimal combination of a wireless terminal and a distributed antenna of a wireless base station that performs multi-user transmission with respect to a plurality of wireless terminals in a multi-BSS wireless environment including a plurality of co-located BSSs or a single BSS wireless environment including a single BSS to improve the throughput is not established.

An object of the present invention is to provide a wireless base station and a scheduling method using distributed antennas capable of scheduling of a wireless terminal and a distributed antenna of a wireless base station that performs multi-user transmission with respect to a plurality of wireless terminals and setting transmission power in a multi-BSS or single BSS wireless environment.

Means for Solving the Problem

A first aspect of the present invention provides a wireless base station which uses distributed antennas and selects a combination of a plurality of wireless terminals and the distributed antennas of a wireless base station that performs multi-user transmission with respect to the plurality of wireless terminals in a multi-BSS wireless environment in which a plurality of BSSs are co-located, the wireless base station including: a scheduling unit that measures reception power (RSSI) from each wireless terminal at each of the distributed antennas and selects a combination of a plurality of wireless terminals and a plurality of antennas having approximately the same RSSIs in descending order for respective wireless terminals; and a transmission power control unit that sets minimum transmission power corresponding to the RSSI of the antenna when multi-user transmission is performed between the plurality of wireless terminals and the plurality of antennas combined by the scheduling unit.

A second aspect of the present invention provides a wireless base station which uses distributed antennas and selects a combination of a plurality of wireless terminals and the distributed antennas of a wireless base station that performs multi-user transmission with respect to the plurality of wireless terminals in a single BSS wireless environment including a single BSS, the wireless base station including: a scheduling unit that measures reception power (RSSI) from each wireless terminal at each of the distributed antennas and selects a combination of a plurality of wireless terminals and a plurality of antennas in which a channel correlation is minimized from a plurality of antennas selected in descending order of RSSI for respective wireless terminals.

A third aspect of the present invention provides a wireless base station which uses distributed antennas and selects a combination of a plurality of wireless terminals and the distributed antennas of a wireless base station that performs multi-user transmission with respect to the plurality of wireless terminals in a multi-BSS wireless environment in which a plurality of BSSs are co-located, the wireless base station including: a scheduling unit that measures reception power (RSSI) from each wireless terminal at each of the distributed antennas and selects a combination of a plurality of wireless terminals and an antenna having a higher RSSI commonly for respective wireless terminals; and a transmission power control unit that sets minimum transmission power corresponding to the RSSI of the antenna when performing multi-user transmission between the plurality of wireless terminals and the antenna combined by the scheduling unit.

In the wireless base station using distributed antennas according to the first to third aspects of the present invention, rather than the distributed antenna measuring the reception power (RSSI) from the wireless terminals, the reception power (RSSI) at each wireless terminal when signals are transmitted from the distributed antenna with the same transmission power is measured and is fed back to the wireless base station.

A fourth aspect of the present invention provides a scheduling method of a wireless base station which uses distributed antennas and selects a combination of a plurality of wireless terminals and the distributed antennas of a wireless base station that performs multi-user transmission with respect to the plurality of wireless terminals in a multi-BSS wireless environment in which a plurality of BSSs are co-located, the scheduling method including: a scheduling step of measuring reception power (RSSI) from each wireless terminal at each of the distributed antennas and selecting a combination of a plurality of wireless terminals and a plurality of antennas having approximately the same RSSIs in descending order for respective wireless terminals; and a transmission power control step of setting minimum transmission power corresponding to the RSSI of the antenna when multi-user transmission is performed between the plurality of wireless terminals and the plurality of antennas combined by the scheduling unit.

A fifth aspect of the present invention provides a scheduling method of a wireless base station which uses distributed antennas and selects a combination of a plurality of wireless terminals and the distributed antennas of a wireless base station that performs multi-user transmission with respect to the plurality of wireless terminals in a single BSS wireless environment including a single BSS, the scheduling method including: a scheduling step of measuring reception power (RSSI) from each wireless terminal at each of the distributed antennas and selecting a combination of a plurality of wireless terminals and a plurality of antennas in which a channel correlation is minimized from a plurality of antennas selected in descending order of RSSI for respective wireless terminals.

A sixth aspect of the present invention provides a scheduling method of a wireless base station which uses distributed antennas and selects a combination of a plurality of wireless terminals and the distributed antennas of a wireless base station that performs multi-user transmission with respect to the plurality of wireless terminals in a multi-BSS wireless environment in which a plurality of BSSs are co-located, the scheduling method including: a scheduling step of measuring reception power (RSSI) from each wireless terminal at each of the distributed antennas and selecting a combination of a plurality of wireless terminals and an antenna having a higher RSSI commonly for respective wireless terminals; and a transmission power control step of setting minimum transmission power corresponding to the RSSI of the antenna when performing multi-user transmission between the plurality of wireless terminals and the antenna combined by the scheduling unit.

The scheduling method of the wireless base station according to the fourth to sixth aspects of the present invention further includes rather than the distributed antenna measuring the reception power (RSSI) from the wireless terminals, measuring the reception power (RSSI) at each wireless terminal when signals are transmitted from the distributed antenna with the same transmission power and feeding the measured reception power back to the wireless base station.

Effects of the Invention

The present invention can select optimal transmission power and an optimal combination of a wireless terminal and a distributed antenna of a wireless base station that performs multi-user transmission with respect to a plurality of wireless terminals in a multi-BSS wireless environment including a plurality of co-located BSSs or a single BSS wireless environment including a single BSS and can improve the throughput.

DESCRIPTION OF EMBODIMENTS

Figure 1:
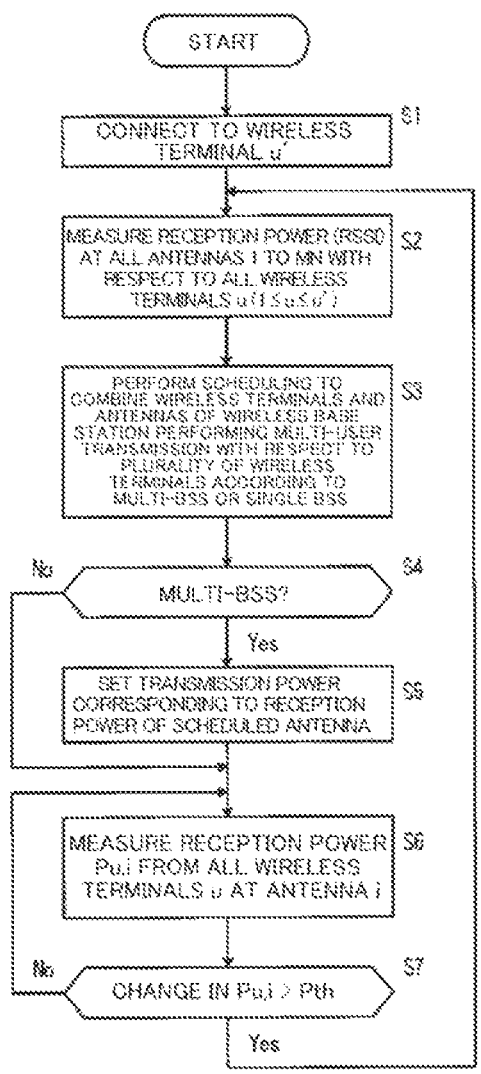
FIG. 1 is a flowchart illustrating a scheduling processing example in a wireless base station of the present invention.

FIG. 1 illustrates a scheduling processing example in a wireless base station of the present invention.

In this scheduling processing, an optimal combination of a wireless terminal and a distributed antenna of a wireless base station that performs multi-user transmission with respect to a plurality of wireless terminals in a multi-BSS wireless environment including a plurality of co-located BSSs or a single BSS wireless environment including a single BSS.

A wireless base station includes a plurality of antennas i (i is 1 to MN) disposed in a distributed manner. M is the number of antennas in one antenna set, N is the number of antenna sets, and MN is a total number of antennas. Although M antennas are disposed in an antenna set to be separated approximately by a half-wavelength, for example, an antenna set is an antenna when M=1. A plurality of wireless terminals u is located around a wireless base station.

In FIG. 1, when a wireless base station is connected to a wireless terminal u' (S1), reception power (RSSIs) $P_{u,1}$ to $P_{u,m}$ to $P_{u,MN}$ of all antennas 1 to MN is measured for all wireless terminals u of 1≤u≤u' (S2). Subsequently, scheduling is performed to combine wireless terminals and antennas of the wireless base station that performs multi-user transmission with respect to a plurality of wireless terminals according to a multi-BSS or single BSS wireless environment (S3). When the measurement of RSSI is performed in parallel for the wireless terminals 1 to u', the scheduling processing needs to be synchronized.

Figure 2:
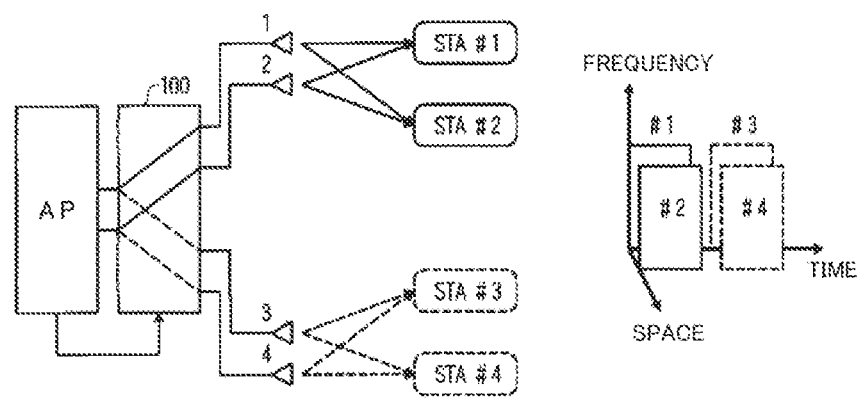
FIG. 2 is a diagram illustrating a scheduling example of MU-MIMO transmission in a multi-BSS environment.
Figure 2:
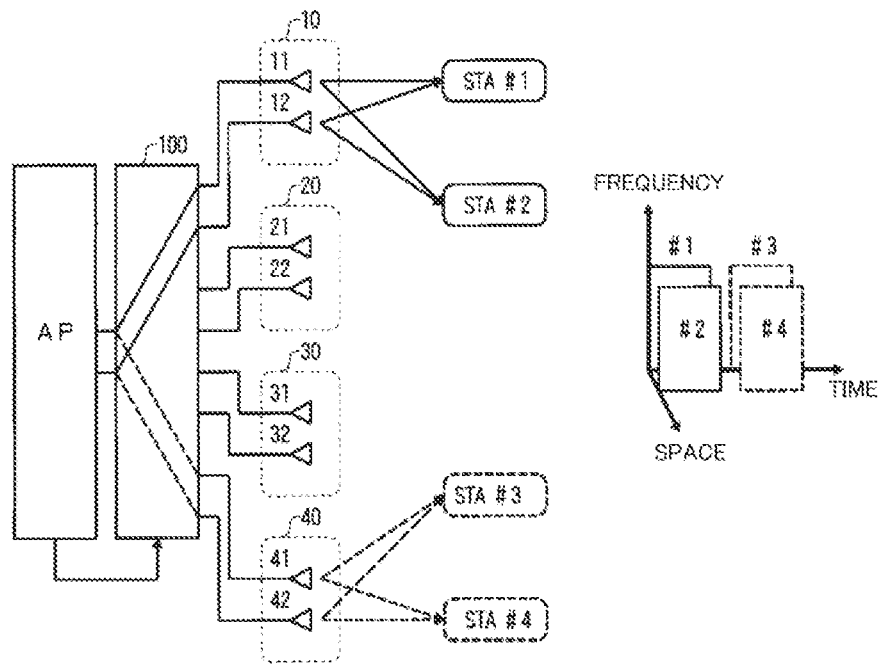
Figure 3:
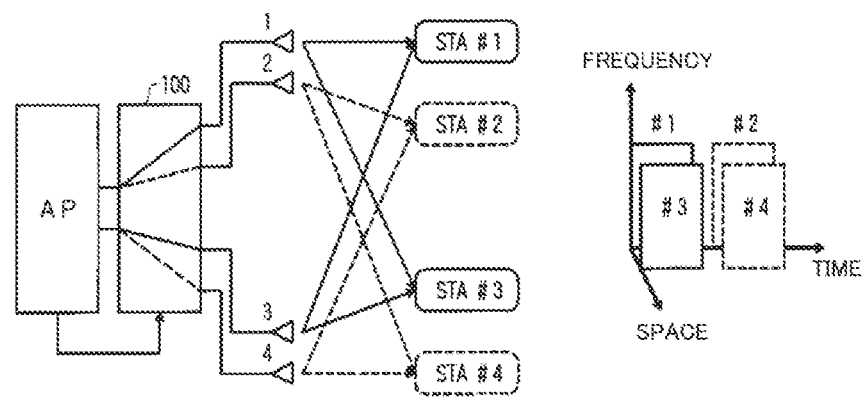
FIG. 3 is a diagram illustrating a scheduling example of MU-MIMO transmission in a single BSS environment.
Figure 3:
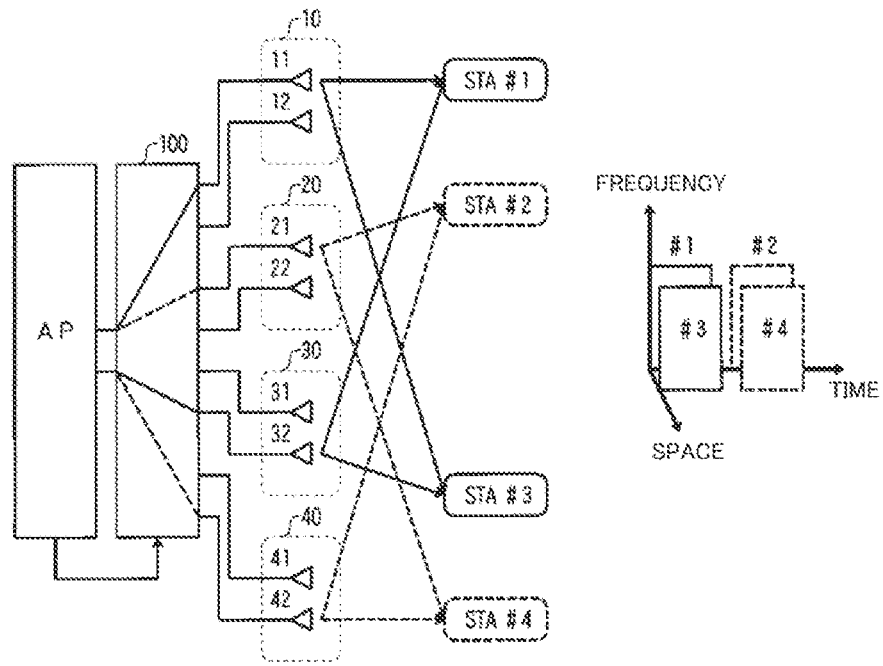
Figure 4:
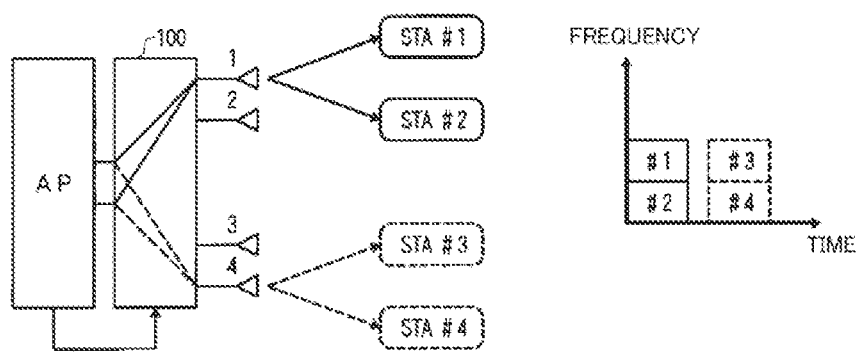
FIG. 4 is a diagram illustrating a scheduling example of OFDMA transmission in a multi-BSS environment.
Figure 5:
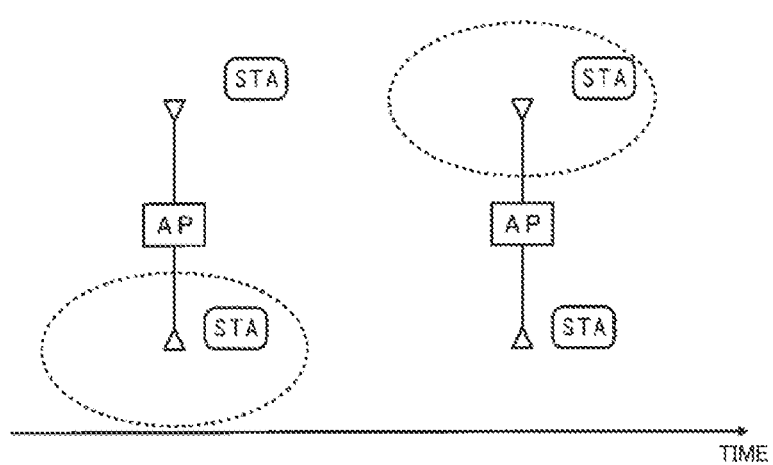
FIG. 5 is a diagram illustrating an example of SU transmission in a distributed antenna system.
Figure 6:
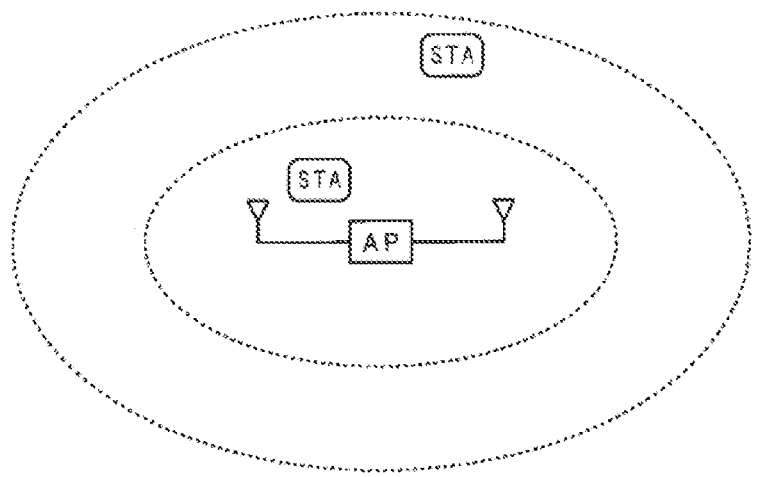
FIG. 6 is a diagram illustrating an example of SU transmission and transmission power control in a distributed antenna system.

In a multi-BSS wireless environment, a combination of wireless terminals and antennas having approximately the same RSSIs for the respective wireless terminals in descending order is selected. In a single BSS wireless environment, antennas for respective wireless terminals are selected in descending order of RSSI, and a combination of wireless terminals and antennas in which a channel correlation is minimized is selected. The details of the scheduling will be described separately with reference to FIG. 2 illustrating a scheduling example of MU-MIMO in a multi-BSS environment, FIG. 3 illustrating a scheduling example of MU-MIMO in a single BSS environment, and FIG. 4 illustrating a scheduling example of OFDMA in a multi-BSS environment. When a wireless base station and a wireless terminal are within the line of sight, the descending order of RSSI is the ascending order of the distance between an antenna and a wireless terminal, and antennas are selected in ascending order of the distance to a wireless terminal.

Subsequently, in the case of a multi-BSS (S4: Yes), the minimum transmission power corresponding to the RSSI of the scheduled antenna is set (S5). In this way, when signals are transmitted from the antenna with the suppressed transmission power, interference to other BSSs becomes the smallest. In the case of a single BSS, it is not necessary to set the transmission power.

Subsequently, the reception power $P_{u,i}$ from all wireless terminals u (1≤u≤u') is measured at the scheduled antenna i every prescribed period (S6), and it is determined whether a change in the reception power $P_{u,i}$ exceeds a threshold $P_{th}$ (S7). When the change exceeds the threshold $P_{th}$, the flow returns to step S2 and the scheduling and the setting of the transmission power is performed again. When a new wireless terminal u' is connected, step S1 to step S2 and the subsequent steps are performed, and the scheduling and the setting of the transmission power is performed again.

Rather than measuring the reception power (RSSI) from each wireless terminal in all antennas, the reception power (RSSI) at each wireless terminal may be measured when signals are transmitted with the same transmission power from all antennas, and the measured reception power may be fed back to a wireless base station.

Hereinafter, scheduling of combining wireless terminals and antennas of a wireless base station that performs multi-user transmission of step S3 in FIG. 1 will be described in detail. However, a combination of wireless terminals and antennas illustrated below is an example, and there is no limitation thereto.

Multi-user transmission involves transmitting signals for two users (in a duplex manner) and transmitting signals in time-divided (TDM) manner for three or more users. In this example, an example in which MU-MIMO transmission or OFDMA transmission is performed with respect to four wireless terminals STA1 to STA4 near a wireless base station AP in a time-divided manner in units of two STAs at a time. The AP includes four antennas 1 to 4 or four antenna sets 10 to 40 disposed in a distributed manner. The antenna set 10 includes two antennas 11 and 12. The same is true for the antenna sets 20 to 40.

FIG. 2 illustrates a scheduling example of MU-MIMO transmission in a multi-BSS environment.

In FIG. 2(1), an AP measures the RSSIs from STAs #1 to 4 at antennas 1 to 4 and selects a combination of two antennas having approximately the same RSSIs for respective STAs in descending order. In this example, a combination of the antennas 1 and 2 having approximately the same RSSIs for STAs #1 and #2 in descending order is selected.

The AP connects to the antennas 1 and 2 via an antenna control unit 100 and performs MU-MIMO transmission with respect to STAs #1 and #2. In this case, since the antenna control unit 100 suppresses the transmission power by setting minimum transmission power corresponding to the RSSIs of the antennas 1 and 2, interference to other BSSs decreases. At the subsequent timing, similarly, MU-MIMO transmission is performed using a combination of the antennas 3 and 4 having approximately the same RSSIs for STAs #3 and #4 in descending order.

In FIG. 2(2), the AP measures the RSSIs from STAs #1 to #4 at two antennas of each of the antenna sets 10 to 40 and selects an antenna set of which the RSSI is maximized for respective STAs. In this example, the antenna set 10 of which the RSSI is maximized is selected for the STAs #1 and #2. The RSSIs from the STAs #1 and #2 at the antennas 11 and 12 of the antenna set 10 are approximately the same.

The AP connects to the antennas 11 and 12 of the antenna set 10 via the antenna control unit 100 and performs MU-MIMO transmission with respect to the STAs #1 and #2. In this case, since the antenna control unit 100 suppresses the transmission power by setting the minimum transmission power corresponding to the RSSIs of the antennas 11 and 12, interference to other BSSs decreases. At the subsequent timing, similarly, MU-MIMO transmission is performed using a combination of the antennas 41 and 42 of the antenna set 40 of which the RSSIs are maximized with respect to the STAs #3 and #4.

As described above, in the multi-BSS environment, since signals are transmitted from antennas which are located near the STA that performs MU-MIMO transmission, and having approximately the same RSSIs with the minimum transmission power corresponding to the RSSIs of the antennas, it is possible to suppress interference to other BSSs as much as possible and to improve the throughput of the entire system.

FIG. 3 illustrates a scheduling example of MU-MIMO transmission in a single BSS environment.

In FIG. 3(1), an AP measures the RSSIs from the STAs #1 to #4 at the antennas 1 to 4 and selects a combination of STAs and antennas in which a channel correlation is minimized from a plurality of antennas selected in descending order of RSSI for respective STAs. In this example, antennas are selected in descending order of RSSI for each of the STAs #1 to #4, and a combination of the STAs #1 and #3 and the antennas 1 and 3 in which a channel correlation is minimized.

The AP connects to the antennas 1 and 3 via the antenna control unit 100 and performs MU-MIMO transmission with respect to the STAs #1 and #3. In this case, since other BSSs are not present, the antenna control unit 100 does not need to control the transmission power by taking interference to other BSSs into consideration. At the subsequent timing, similarly, a combination of the antennas 2 and 4 and the STAs #2 and #4 is selected and MU-MIMO transmission is performed using the selected combination.

In FIG. 3(2), the AP measures the RSSIs from the STAs #1 to #4 at two antennas of each of the antenna sets 10 to 40 and selects a combination of STAs and antenna sets in which a channel correlation is minimized from N sets of antennas selected in descending order of RSSI for respective STAs. In this example, antenna sets are selected in descending order of RSSI for each of the STAs #1 and #4 and a combination of the STAs #1 and #3 and the antenna 11 of the antenna set 10 and the antenna 32 of the antenna set 30 in which a channel correlation is minimized.

The AP connects to the antenna 11 of the antenna set 10 and the antenna 32 of the antenna set 30 via the antenna control unit 100 and performs MU-MIMO transmission with respect to the STAs #1 and #3. In this case, since other BSSs are not present, the antenna control unit 100 does not need to control the transmission power by taking interference to other BSSs into consideration. At the subsequent timing, similarly, a combination of the STAs #2 and #4 and the antenna 21 of the antenna set 20 and the antenna 42 of the antenna set 40 is selected and MU-MIMO transmission is performed using the selected combination.

FIG. 4 illustrates a scheduling example of OFDMA transmission in a multi-BSS environment.

In FIG. 4, the AP measures the RSSIs from the STAs #1 to #4 at the antennas 1 to 4 and selects an antenna in descending order of RSSI for respective STAs. In this example, the antenna 1 having a higher RSSI commonly for the STAs #1 and #2 is selected for the STAs #1 and #2.

The AP connects to the antenna 1 via the antenna control unit 100 and performs OFDMA transmission with respect to the STAs #1 and #2. In this case, since the antenna control unit 100 suppresses the transmission power by setting the minimum transmission power corresponding to the RSSI of the antenna 1, interference to other BSSs decreases. At the subsequent timing, similarly, OFDMA transmission is performed with respect to the STAs #3 and #4 using the antenna 4 having a higher RSSI commonly for the STAs #3 and #4.

In the above description, although multi-user transmission involves transmitting signals for two users (in a duplex manner), multi-user transmission may be performed similarly for three or more users.

Although the above description is based on a configuration of a distributed antenna system, the present invention can be applied to a system including a plurality of directional antennas having different directivities instead of distributed antennas, for example, without being limited to the distributed antennas.

Although the above description is provided assuming that a scheduling unit of a wireless terminal is mounted on a wireless LAN chip, scheduling may be realized by connecting the same combinations to a unique basic service set identifier (BSSID) using a virtual AP (VAP) function, for example.

Reference Signs List

AP Wireless base station
STA Wireless terminal
1, 2, 3, 4, 11, 12, 21, 22, 31, 32, 41, 42 Antenna
10, 20, 30, 40 Antenna set
100 Antenna control unit

The invention claimed is:

1. A wireless base station which uses distributed antennas and selects a combination of a plurality of wireless terminals and the distributed antennas of a wireless base station that performs multi-user transmission with respect to the plurality of wireless terminals in a multi-BSS wireless environment in which a plurality of BSSs are co-located, the wireless base station comprising:
   a scheduling unit that:
      measures reception power (RSSI) from each wireless terminal at each of the distributed antennas; and
      selects a combination of a plurality of wireless terminals and a plurality of antennas based on minimizing a channel correlation and the wireless terminals and antennas having approximately the same RSSIs, the selection being in descending order of RSSI for respective wireless terminals; and
   a transmission power control unit that sets a minimum transmission power corresponding to the RSSI of the antenna when multi-user transmission is performed between the plurality of wireless terminals and the plurality of antennas selected by the scheduling unit.

2. The wireless base station using distributed antennas according to claim 1, wherein rather than the distributed antenna measuring the reception power (RSSI) from the wireless terminals, the reception power (RSSI) at each wireless terminal when signals are transmitted from the distributed antenna with the same transmission power is measured and is fed back to the wireless base station.

3. A scheduling method of a wireless base station which uses distributed antennas and selects a combination of a plurality of wireless terminals and the distributed antennas of a wireless base station that performs multi-user transmission with respect to the plurality of wireless terminals in a multi-BSS wireless environment in which a plurality of BSSs are co-located, the scheduling method comprising:
   a scheduling step of:
      measuring reception power (RSSI) from each wireless terminal at each of the distributed antennas; and
      selecting a combination of a plurality of wireless terminals and a plurality of antennas based on minimizing a channel correlation and the wireless terminals and antennas having approximately the same RSSIs in descending order of RSSI for respective wireless terminals; and
   a transmission power control step of setting minimum transmission power corresponding to the RSSI of the antenna when multi-user transmission is performed between the plurality of wireless terminals and the plurality of antennas selected during the scheduling step.

4. The scheduling method of the wireless base station according to claim 3, further comprising: rather than the distributed antenna measuring the reception power (RSSI) from the wireless terminals, measuring the reception power (RSSI) at each wireless terminal when signals are transmitted from the distributed antenna with the same transmission power and feeding the measured reception power back to the wireless base station.

* * * * *